(12) United States Patent
Chen et al.

(10) Patent No.: US 11,506,860 B2
(45) Date of Patent: Nov. 22, 2022

(54) FOCUSING DEVICE

(71) Applicant: TRIPLE WIN TECHNOLOGY(SHENZHEN) CO. LTD., Shenzhen (CN)

(72) Inventors: Jin-Ke Chen, Jincheng (CN); Xing-Yuan Zhang, JinCheng (CN); Wei Wang, JinCheng (CN); Jie Wang, JinCheng (CN); Peng-Qi Yu, JinCheng (CN); Yi-Bo Xing, JinCheng (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 146 days.

(21) Appl. No.: 17/023,699

(22) Filed: Sep. 17, 2020

(65) Prior Publication Data
US 2021/0181454 A1   Jun. 17, 2021

(30) Foreign Application Priority Data

Dec. 11, 2019   (CN) .......................... 201922216368.2

(51) Int. Cl.
*G02B 7/02*   (2021.01)
*G02B 7/04*   (2021.01)

(52) U.S. Cl.
CPC ............... *G02B 7/04* (2013.01); *G02B 7/026* (2013.01)

(58) Field of Classification Search
CPC .................................. G02B 7/04; G02B 7/026
USPC .................................................... 359/825, 830
See application file for complete search history.

(56) References Cited

U.S. PATENT DOCUMENTS

| 4,553,817 A | * | 11/1985 | Ando | ....................... G02B 7/10 |
| | | | | 359/825 |
| 7,706,084 B2 | * | 4/2010 | Lin | .................. G08B 13/19626 |
| | | | | 359/830 |

FOREIGN PATENT DOCUMENTS

CN   209765136 U   * 12/2019

* cited by examiner

*Primary Examiner* — Mahidere S Sahle
(74) *Attorney, Agent, or Firm* — ScienBiziP, P.C.

(57) ABSTRACT

A focusing device includes a fixing base, a screw rod, a focusing gear, a height adjusting ring, and a focusing ring. A first through hole is defined in the fixing base, the screw rod with a first thread is movably mounted on the fixing base. The focusing gear is also mounted on the fixing base and defines a third through hole corresponding to the first through hole. An outer wall of the focusing gear has an engaging portion meshing with the first thread. The focusing ring is movably received in the third through hole and located on a side of the height adjusting ring away from the fixing base. The height adjusting ring can adjust a distance between the focusing ring and a lens module to avoid distortion of an optical lens in any circumstances during focusing.

9 Claims, 6 Drawing Sheets

FOCUSING DEVICE

FIELD

The subject matter herein generally relates to optical devices, and more particularly to a focusing device.

BACKGROUND

During testing a lens module, a user can rotate a focusing ring by hand to execute a focusing operation. When rotating the focusing ring manually, the focusing ring may squeeze the lens module, which reduces the accuracy of focusing.

BRIEF DESCRIPTION OF THE DRAWINGS

Implementations of the present technology will now be described, by way of embodiment, with reference to the attached figures.

DETAILED DESCRIPTION

Figure 1:
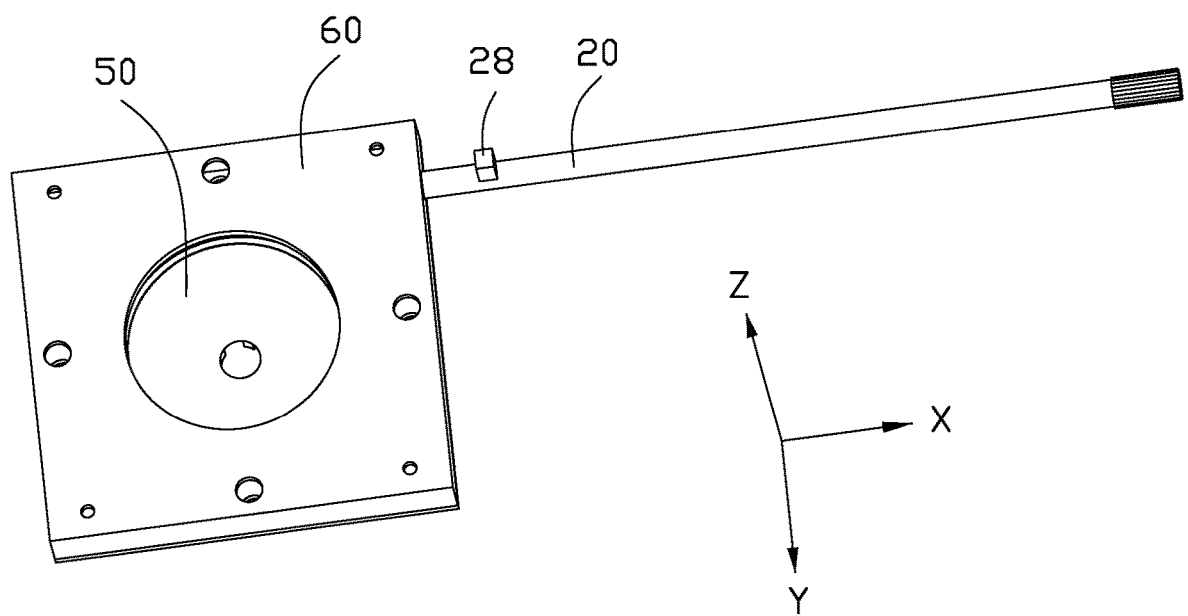
FIG. 1 is an isometric view of an embodiment of a focusing device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

FIGS. 1 to 4 illustrates a focusing device in one embodiment (focusing device 100). The focusing device 100 includes a fixing base 10, a screw rod 20, a focusing gear 30, a height adjusting ring 40, a focusing ring 50, and a protective cover 60. The focusing device 100 is applied on a lens module (not shown) and is configured to zoom the lens module in and out.

The fixing base 10 is substantially a rectangular plate. The fixing base 10 defines a first through hole 12 on a center portion. The first through hole 12 is substantially circular.

A length direction of the rectangular plate is defined as an X axis, a width direction of the rectangular plate is defined as a Y axis, and a height direction of the rectangular plate is defined as a Z axis. The Z axis is parallel to an axial direction of the first through hole 12.

Figure 4:
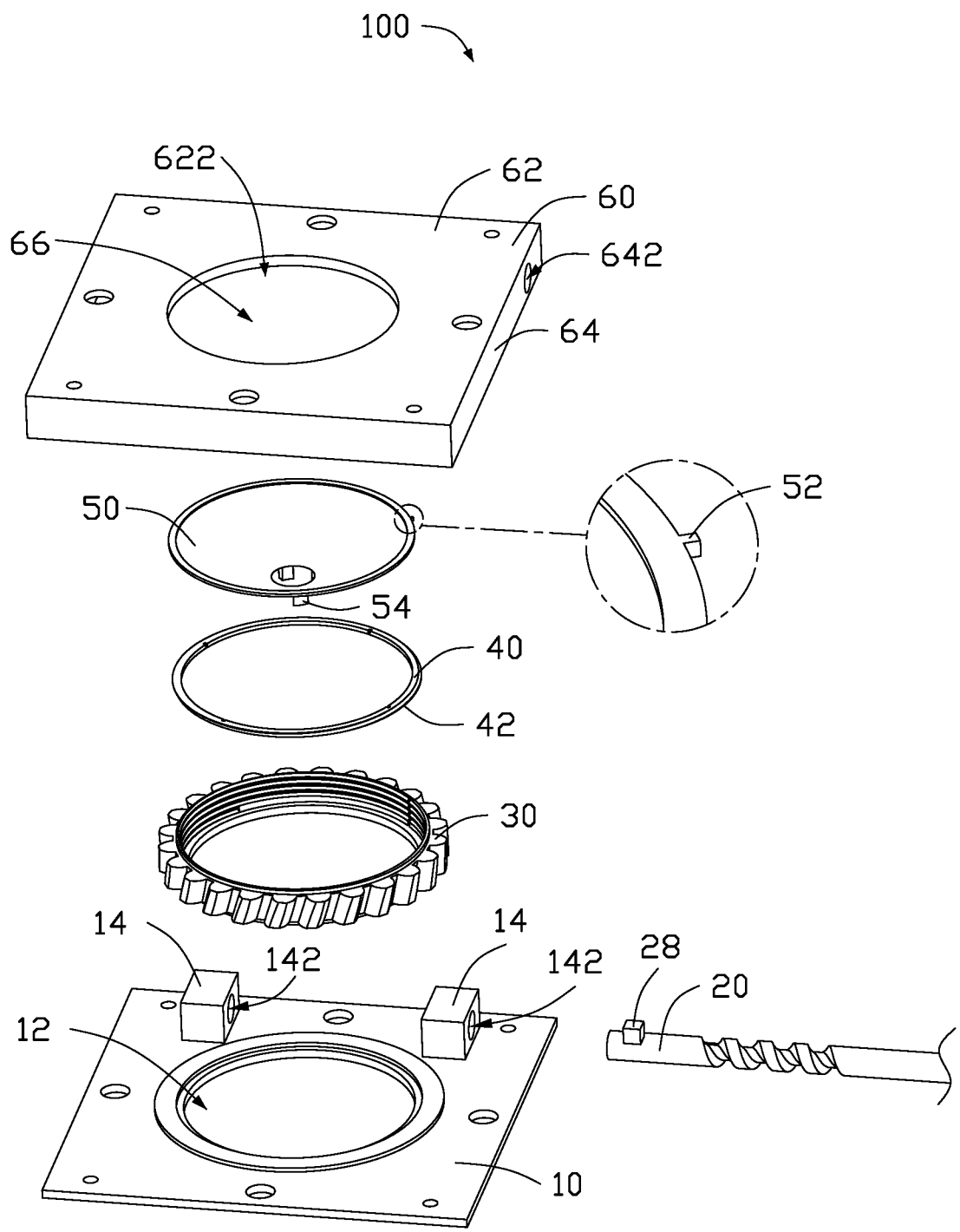
FIG. 4 is an exploded, isometric view of the focusing device of FIG. 1.

Referring to FIG. 4, a protrusion 14 is disposed on a surface of the fixing base 10. The protrusion 14 is configured to support the screw rod 20. In some embodiments, there are two protrusions 14 disposed on the fixing base 10. Each of the two protrusions 14 defines a second through hole 142, an axial direction of the second through hole 142 is parallel to the X axis. The screw rod 20 is movably received in the second through hole 142, and can movably pass through the second through hole 142, the screw rod 20 can thus move back and forth along the X axis.

Figure 2:
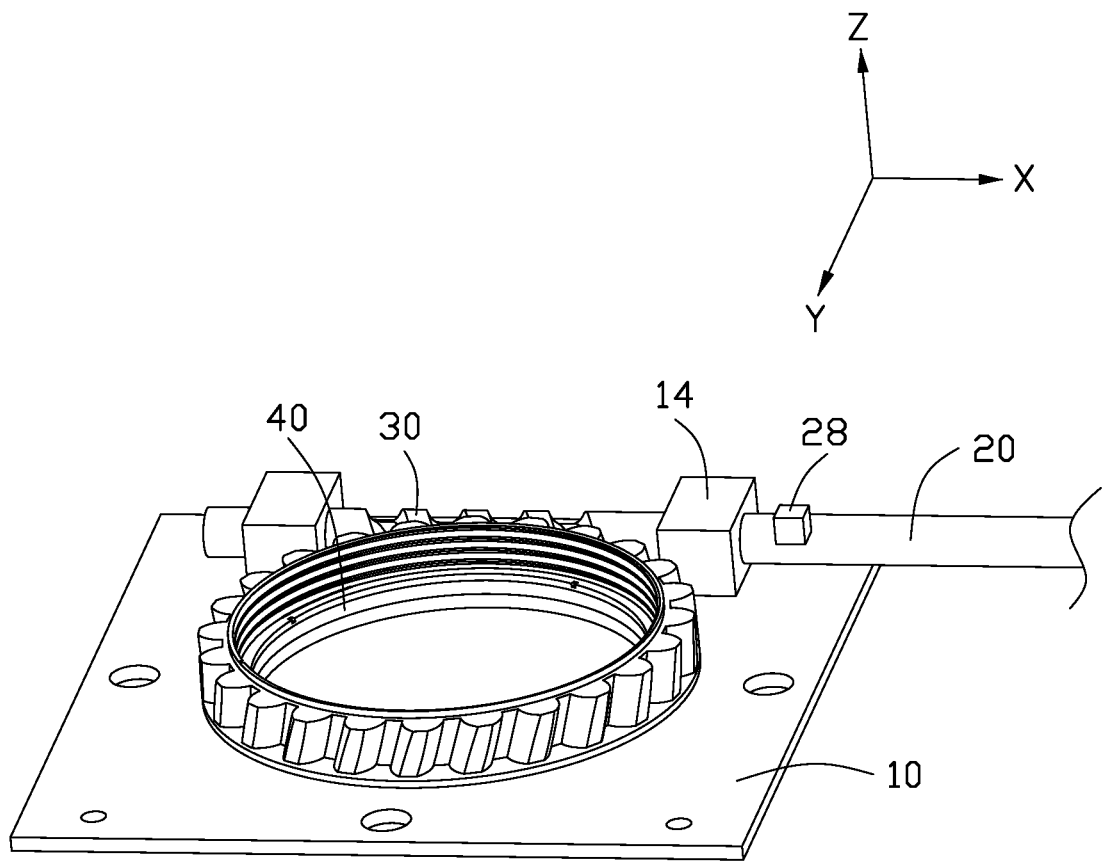
FIG. 2 is an isometric view of the focusing device of FIG. 1 without protective cover and focusing ring.

Referring to FIG. 2, the screw rod 20 is a rod or cylinder of material. A diameter of the screw rod 20 is slightly smaller than a diameter of the second through hole 142, so that the screw rod 20 can pass through the second through hole 142.

Figure 5:
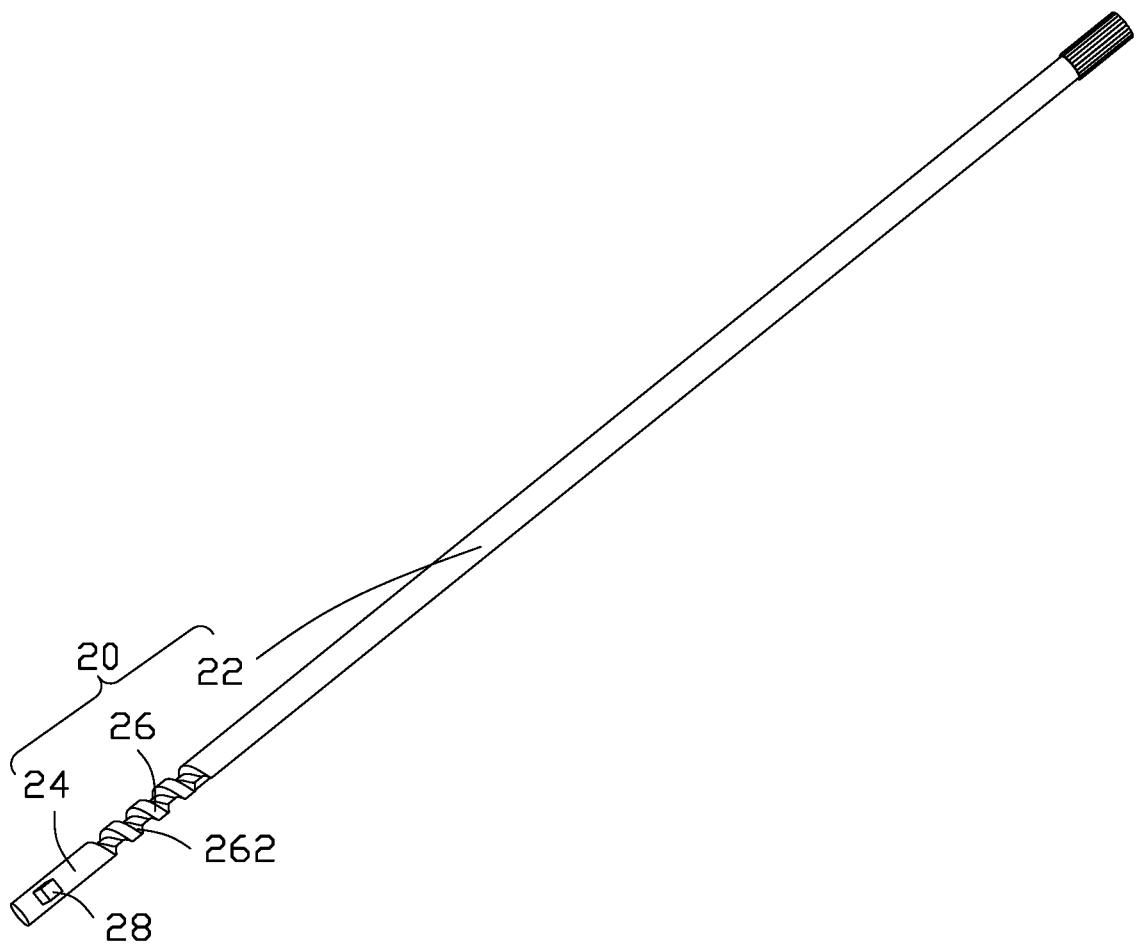
FIG. 5 is an isometric view of an embodiment of a screw rod.

Referring to FIG. 5, the screw rod 20 includes a driving portion 22, a movable portion 24, and a threaded portion 26 arranged between the driving portion 22 and the movable portion 24.

The driving portion 22 is located at one of the protrusions 14 and is configured to connect to a driving device, such as a motor. The motor can drive the driving portion 22 to rotate, thereby driving the screw rod 20 to rotate. The movable portion 24 is located at the other protrusion 14.

The threaded portion 26 is located between the two protrusions 14. The threaded portion 26 has a first thread 262 for meshing with the focusing gear 30 to drive the focusing gear 30 to move.

In some embodiments, a length of the first thread 262 in the X axis is smaller than a distance between the two protrusions 14, which ensures that the screw rod 20 rotates smoothly in the second through hole 142, thereby improving an accuracy of focusing.

The screw rod 20 is provided with a positioning portion 28, which is convenient for counting the number of turns of rotating the screw rod 20. The positioning portion 28 may be disposed on the driving portion 22, the movable portion 24, or the thread portion 26, and is exposed out of the protrusions 14. The positioning portion 28 may be a groove defined on the screw rod 20 or a protrusion protruding from the screw rod 20. In one embodiment, the positioning portion 28 is a protrusion protruding from the screw rod 20.

Figure 6:
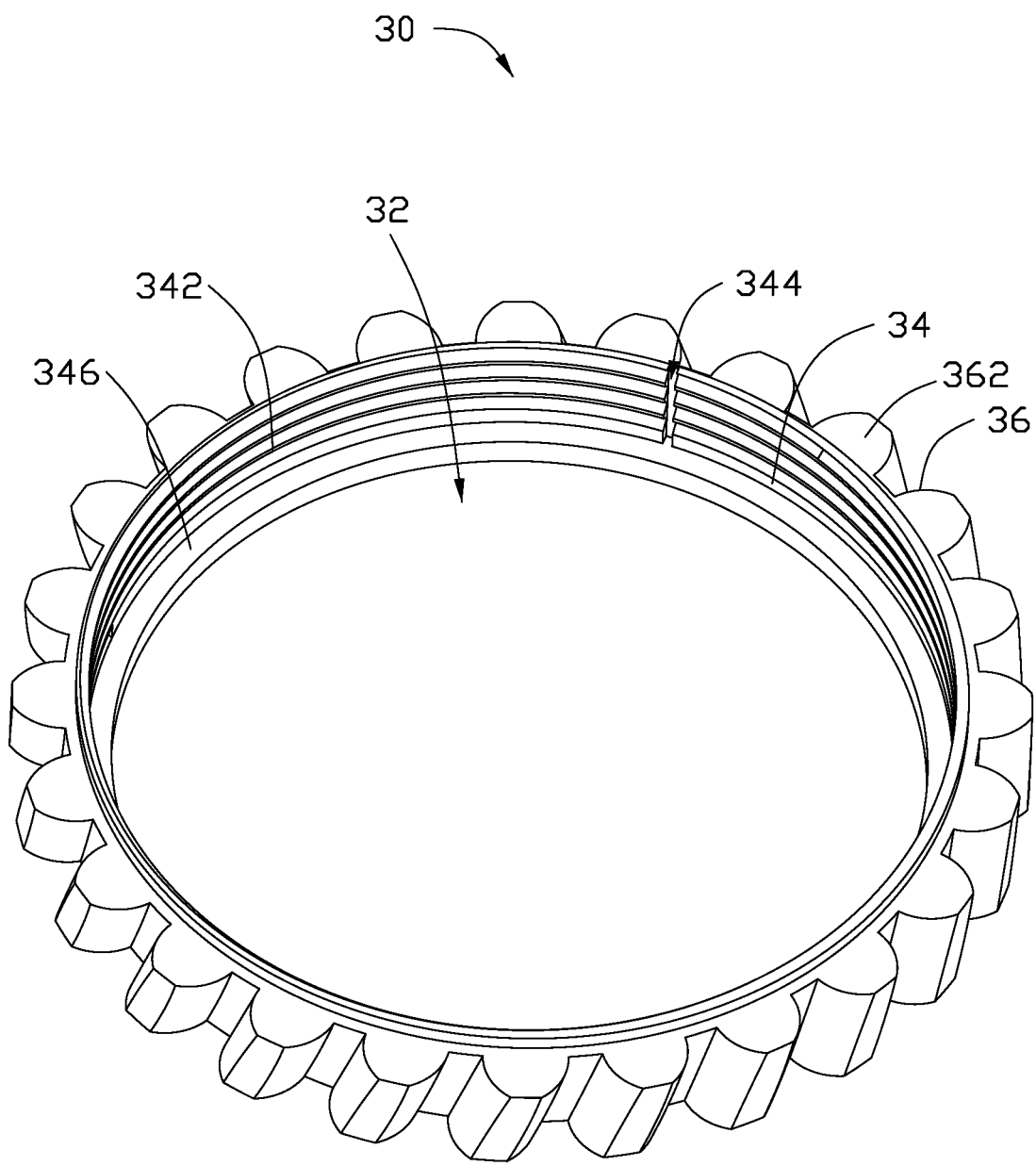
FIG. 6 is an isometric view of an embodiment of a focusing gear.

Referring to FIG. 6, the focusing gear 30 is substantially ring-shaped. The focusing gear 30 defines a third through hole 32 with a diameter matching that of the first through hole 12 and corresponding to the first through hole 12. The third through hole 32 and the first through hole 12 are arranged along a common axis. The focusing gear 30 and the protrusions 14 are located on a same surface of the fixing base 10.

The focusing gear 30 includes an inner wall 34 and an outer wall 36 opposite to the inner wall 34. The inner wall 34 encases the third through hole 32. The outer wall 36 is provided with an engaging portion 362 meshing with the first thread 262. The engaging portion 362 carries teeth which may be helical or arcing with a concave surface. In one embodiment, the teeth of the engaging portion 362 are helical teeth, and the engaging portion 362 is composed of a plurality of meshing teeth which are inclined relative to the Z axis. When the screw rod 20 rotates around the X axis, the focusing gear 30 engaged with the screw rod 20 rotates around the Z axis.

Referring to FIGS. 2 and 4, the inner wall 34 of the focusing gear 30 is provided with a second thread 342. An outer edge of the height adjusting ring 40 is provided with a third thread 42 meshing with the second thread 342, so that the height adjusting ring 40 is received in and engaged with the focusing gear 30.

Referring to FIGS. 4 and 6, a bottom of the inner wall 34 of the focusing gear 30, that is an area where the focusing gear 30 is connected to the fixing base 10, is provided with a blocking portion 346. The blocking portion 346 protrudes beyond the second thread 342 and extends toward the first through hole 12. The blocking portion 346 can block the height adjusting ring 40.

The focusing gear 30 defines a notch 344 passing through the second thread 342 along the Z axis.

Figure 3:
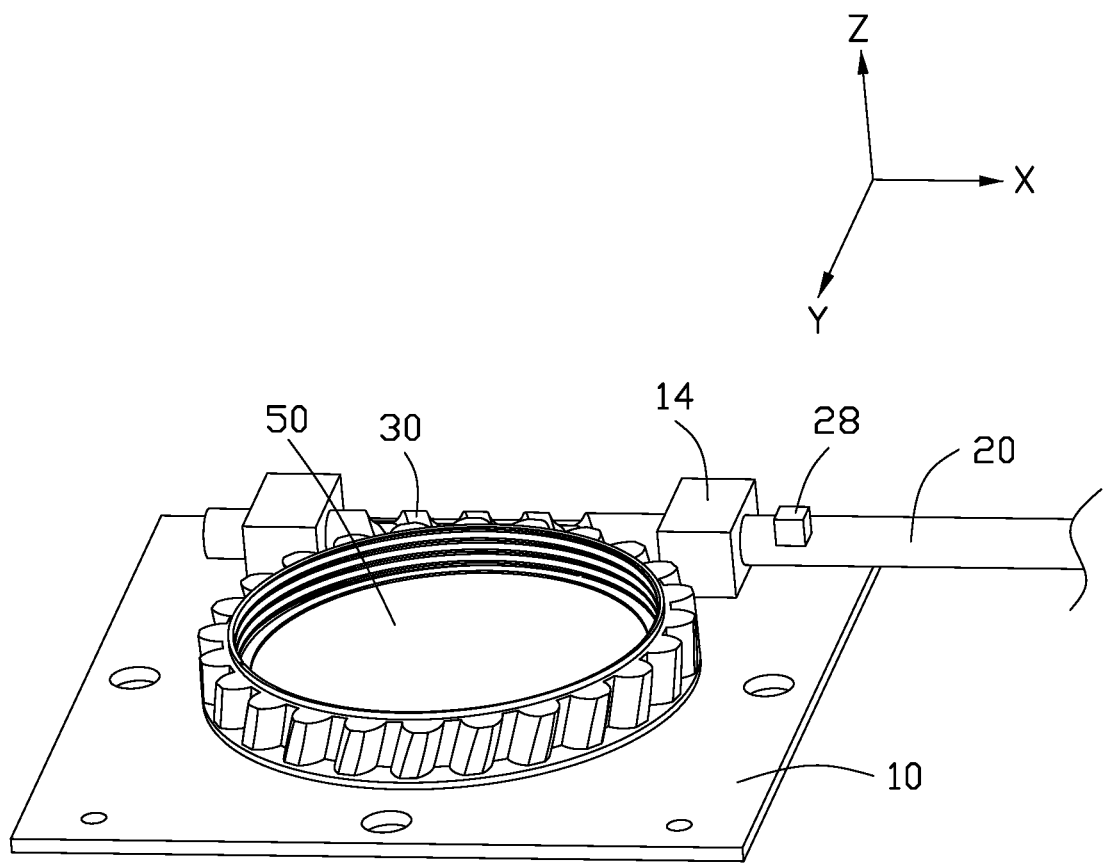
FIG. 3 is an isometric view showing the focusing device with the focusing ring.

Referring to FIGS. 3 and 4, the focusing ring 50 is movably received in the focusing gear 30 and located on a side of the height adjusting ring 40 away from the fixing base 10. An outer periphery of the focusing ring 50 is provided with a latching member 52 matching with the notch 344. The latching member 52 is received in the notch 344. The focusing ring 50 includes a focusing portion 54. The focusing portion 54 passes through the height adjusting ring 40 along the Z axis and is received in the first through hole 12. The focusing portion 54 can zoom the lens module in and out. When the focusing gear 30 rotates around the Z axis, the focusing ring 50 is driven to rotate around the Z axis, thereby adjusting the focus of the lens module. A position of the height adjusting ring 40 can be adjusted according to needs, a distance between the focusing ring 50 and the lens module can thus be adjusted to be appropriate, preventing the focusing ring 50 from squeezing the lens module and reducing any distortion in the focusing.

The protective cover 60 includes a top plate 62 and four side plates 64 perpendicular to the top plate 62. The top plate 62 and the four side plates 64 enclose a chamber 66. The top plate 62 defines a fourth through hole 622, the fourth through hole 622, and the first through hole 12 are arranged along a common axis. One of the four side plates 64 defines a fifth through hole 642, the fifth through hole 642 and the second through hole 142 are arranged along a common axis. The protective cover 60 is detachably covering the fixing base 10. The focusing gear 30, the height adjusting ring 40, and the focusing ring 50 are all received in the chamber 66 of the protective cover 60, and the focusing ring 50 is exposed outside the focusing device 100 through the fourth through hole 622. The screw rod 20 passes through and is received in the fifth through hole 642. The protective cover 60 protects the focusing gear 30, the height adjusting ring 40, the focusing ring 50, and the screw rod 20 from scratches and impacts.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A focusing device comprising:
a fixing base defines a first through hole;
a screw rod movably mounted on the fixing base, wherein the screw rod has a first thread;
a focusing gear mounted on the fixing base, wherein the focusing gear defines a third through hole corresponding to the first through hole, the focusing gear comprises an inner wall encasing the third through hole and an outer wall opposite to the inner wall, the inner wall is provided with a second thread, the focusing gear further defines a notch passing through the second thread along an axial direction of the third through hole, the outer wall has an engaging portion meshing with the first thread;
a height adjusting ring received in the third through hole; and
a focusing ring movably received in the third through hole and located on a side of the height adjusting ring away from the fixing base, wherein an outer periphery of the focusing ring is provided with a latching member matching with the notch, the latching member is received in the notch;
wherein the height adjusting ring is configured to adjust a distance between the focusing ring and a lens module, the screw rod is configured to drive the focusing gear and to rotate, the focusing ring thus rotates to zoom the lens module.

2. The focusing device of claim 1, wherein the fixing base is provided with at least one protrusion, each of the at least one protrusion defines a second through hole, the screw rod is movably received in the second through hole.

3. The focusing device of claim 2, wherein the fixing base is provided with two protrusions, the screw rod comprises a driving portion, a movable portion, and a threaded portion between the driving portion and the movable portion, the driving portion is located on one of the two protrusions, the movable portion is located on the other one of the two protrusions, the threaded portion is located between the two protrusions and has the first thread.

4. The focusing device of claim 1, wherein the first through hole and the third through hole are arranged along a common axis.

5. The focusing device of claim 4, wherein an outer edge of the height adjusting ring is provided with a third thread meshing with the second thread, the height adjusting ring is engaged with the focusing gear.

6. The focusing device of claim 5, wherein an area where the focusing gear is connected to the fixing base is provided with a blocking portion, the blocking portion protrudes beyond the second thread.

7. The focusing device of claim 1, wherein the focusing ring comprises a focusing portion passing through the height adjusting ring and received in the first through hole.

8. The focusing device of claim 1, further comprising a protective cover detachably covering on the fixing base, wherein the protective cover comprises a top plate and four side plates perpendicular to the top plate, the top plate and the four side plates enclose a chamber, the focusing gear, the height adjusting ring, and the focusing ring are all received in the chamber.

9. The focusing device of claim 1, wherein the screw rod is provided with a positioning portion.

* * * * *